(12) United States Patent
Wolff et al.

(10) Patent No.: US 10,403,300 B2
(45) Date of Patent: Sep. 3, 2019

(54) SPECTRAL ESTIMATION OF ROOM ACOUSTIC PARAMETERS

(71) Applicant: Nuance Communications, Inc., Burlington, MA (US)

(72) Inventors: Tobias Wolff, Neu-Ulm (DE); Naveen Kumar Desiraju, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 16/084,771

(22) PCT Filed: Mar. 17, 2016

(86) PCT No.: PCT/US2016/022857
§ 371 (c)(1),
(2) Date: Sep. 13, 2018

(87) PCT Pub. No.: WO2017/160294
PCT Pub. Date: Sep. 21, 2017

(65) Prior Publication Data
US 2019/0080709 A1  Mar. 14, 2019

(51) Int. Cl.
*G10L 21/0224* (2013.01)
*G10L 21/0208* (2013.01)
(Continued)

(52) U.S. Cl.
CPC .......... *G10L 21/0224* (2013.01); *G01H 7/00* (2013.01); *G10L 21/0208* (2013.01);
(Continued)

(58) Field of Classification Search
CPC ............. G10L 21/0224; G10L 21/0208; G10L 2021/02082; G10L 2021/02166;
(Continued)

(56) References Cited

U.S. PATENT DOCUMENTS 8,160,262 B2  4/2012 Buck et al.
2008/0292108 A1  11/2008 Buck et al.
(Continued)

OTHER PUBLICATIONS

International Preliminary Report on Patentability of the International Searching Authority, for PCT/US2016/022857, entitled "Spectral Estimation Of Room Acoustic Parameters," dated Sep. 18, 2018.
(Continued)

*Primary Examiner* — David L Ton
(74) *Attorney, Agent, or Firm* — Ohlandt, Greeley, Ruggiero & Perle, L.L.P.

(57) ABSTRACT

A system and associated method for estimating one or more reverberation parameters includes an adaptive, parametric, linear prediction filter having one or more power spectral density (PSD) estimates of signals of one or more channels as inputs. The prediction filter estimates at least one parameter related to reverberation time, such as $T_{60}$, and can further estimate an additional parameter, such as Direct-to-Reverberant Ratio (DRR). The prediction filter may be adapted during a period of reverberation by minimizing a cost function. Adaptation can include using a gradient descent approach, which can operate according to a step size provided by an adaptation controller configured to determine the period of reverberation. One or more microphones can provide the signals. The reverberation parameters estimated can be applied to a reverberation suppressor, with an estimator that does not require a training phase and without relying on assumptions of the user's position relative to the microphones.

20 Claims, 8 Drawing Sheets

(51) Int. Cl.
*G10L 21/0216* (2013.01)
*H04R 3/00* (2006.01)
*H04R 5/027* (2006.01)
*H04R 5/04* (2006.01)
*G01H 7/00* (2006.01)

(52) U.S. Cl.
CPC .............. *H04R 3/005* (2013.01); *H04R 5/027* (2013.01); *H04R 5/04* (2013.01); *G10L 2021/02082* (2013.01); *G10L 2021/02166* (2013.01)

(58) Field of Classification Search
CPC .......... H04R 3/005; H04R 5/027; H04R 5/04; G01H 7/00
USPC ................................................... 381/66, 94.1
See application file for complete search history.

(56) References Cited

U.S. PATENT DOCUMENTS

| | | | |
|---|---|---|---|
| 2009/0214054 A1 | 8/2009 | Fuji et al. | |
| 2010/0211382 A1* | 8/2010 | Sugiyama | H04B 3/23 704/205 |
| 2013/0208903 A1 | 8/2013 | Ojala | |
| 2013/0230184 A1* | 9/2013 | Kuech | H04M 9/085 381/66 |
| 2014/0037094 A1 | 2/2014 | Ma et al. | |
| 2014/0169575 A1 | 6/2014 | Gao et al. | |
| 2014/0229168 A1* | 8/2014 | Pandya | G10L 21/0264 704/219 |
| 2018/0172502 A1* | 6/2018 | Shi | G01H 7/00 |

OTHER PUBLICATIONS

Habets, E.A.P., "Speech dereverberation using statistical reverberation models", in Speech Dereverberation, P.A. Naylor and N.D. Gaubitch, Springer, London, 2010, ch. 3, pp. 57-93.

Shynk, J.J., "Adaptive IIR Filtering", IEEE ASSP Magazine, vol. 6, No. 2, pp. 4-21, Apr. 1989.

Thiergart, et al., "Signal to Reverberant Ratio Estimation based on the Complex Spatial Coherence Between Omnidirectional Microphones," Proc. Int'l Conf. Speech and Signal Processing, 2012 (ICASSP 2012).

Polack, J., "La transmission de l'énergie sonore dans les salles", Dissertation, Université du Maine, 1988.

Gaubitch, N.D., et al., "Performance Comparison of Algorithms for Blind Reverberation Time Estimation From Speech," Centre for Law Enforcement Audio Research (CLEAR), Imperial College London, UK Inst. of Comm. Systems and Data Proc., RWTH Aachen University, Germany Institute National de la Recherche Scientifique, Montreal, Canada, 4 pages, (Sep. 2012).

Notification of Transmittal of the International Search Report and the Written Opinion of the International Searching Authority, or the Declaration, "Spectral Estimation Of Room Acoustic Parameters," PCT/US2016/022857, dated Nov. 18, 2016.

* cited by examiner

SPECTRAL ESTIMATION OF ROOM ACOUSTIC PARAMETERS

RELATED APPLICATION

This application is the U.S. National Stage of International Application No. PCT/US2016/22857, filed Mar. 17, 2016, which designates the U.S. and published in English The entire teachings of the above application are incorporated herein by reference.

BACKGROUND

Reverberation occurs when a sound source, such as a person speaking or a loudspeaker, emits an acoustic signal that propagates through a room. Sound reaches a microphone in a direct path and, with some delay, further sound from the reflections of sound off boundaries, such as walls, also reaches the microphone. Reverberation alters the characteristics of the acoustic signal. This can be problematic for speech recognition applications.

SUMMARY OF THE INVENTION

An embodiment of a method of estimating one or more reverberation parameters includes applying an adaptive, parametric, linear prediction filter configured to receive one or more power spectral density (PSD) estimates of signals of one or more channels as inputs. The prediction filter estimates at least one reverberation parameter related to reverberation time. Further, the prediction filter may be adapted during a period of reverberation by minimizing a cost function.

The method can include adapting the prediction filter using a gradient descent approach. The gradient descent approach can operate according to a step size, which can be provided by an adaptation controller.

The method can further include determining the period of reverberation by detecting that only reverberation is present in the signals. For example, the period of reverberation can be determined by estimating a direct-to-reverberant ratio. Estimating the direct-to-reverberant ratio can provide spectral information of the presence of direct sound components over reverberant sound components. The direct and reverberant sound components can be described by spectral coherence functions, which may be computed for at least two of the signals. The coherent parts of the coherence functions can be indicative of direct sound components. The diffuse parts of the coherence functions can be indicative of the reverberant sound components.

Determining the period of reverberation can include using decay detection. In a particular example, using decay detection includes detecting decaying signal components by comparing two smoothed power spectral density (PSD) estimates. A first of the two smoothed PSD estimates can correspond to a current frame and a second of the two smoothed PSD estimates can be delayed by a selected number of frames relative to the current frame.

The prediction filter can be implemented, for example, as an infinite impulse response (IIR) filter or as a finite impulse response (FIR) filter. In the case of an IIR filter, the method of estimating the one or more reverberation parameters can further include computing a gradient of the cost function according to a recursive prediction error principle.

The prediction filter can further estimate a reverberation parameter related to the ratio of power of direct sound and power of reverberation.

The cost function can be at least one of a cost function that is independent of power of the signals and a logarithmic cost function.

The method can further include applying the at least one reverberation parameter estimated to a reverberation suppressor.

An embodiment of a system for estimating one or more reverberation parameters includes an adaptive, parametric, linear prediction filter having one or more power spectral density (PSD) estimates of signals of one or more channels as inputs. The prediction filter is configured to estimate at least one reverberation parameter related to reverberation time. Further, the prediction filter may be adapted during a period of reverberation by minimizing a cost function.

The system can include an adaptation controller configured to determine the period of reverberation. The prediction filter can be adapted using a gradient descent approach, the gradient descent approach operating according to a step size provided by the adaptation controller.

The system can include one or more microphones to provide the signals. The microphones can be arranged in an array.

The system can further include a reverberation suppressor configured to suppress reverberation in at least one of the signals based on the at least one reverberation parameter.

In an embodiment, a system for estimating one or more reverberation parameters includes an adaptive, parametric, multichannel, linear prediction filter having power spectral density (PSD) estimates of signals of multiple channels as inputs. The prediction filter is configured to estimate at least one reverberation parameter related to reverberation time. The prediction filter may be adapted during a period of reverberation by minimizing a cost function that is independent of power of the signals.

Embodiments of the present invention have several advantages. Although multi-microphone methods, such as beamforming and spatial post-filtering, exist, those methods rely on assumptions including that the position of the user relative to the microphone array is known. Embodiments of present invention can be used to implement a reverberation suppressor that does not rely on such assumptions.

A prior method to estimate the late reverberation power spectral density (PSD) assumes the reverberation time $T_{60}$ to be known and adaptively adjusts the reverberation PSD estimate, where $T_{60}$ is defined as the time until reverberation sounds decay to a power level of about 60 dB below the initial sound. The latter is done in a broadband manner, i.e., computing an estimate averaged over a range of frequencies. Further, the Direct-to-Reverberant Ratio (DRR) cannot be retrieved from this method. Knowledge of the $T_{60}$ and the DRR is not only useful for removing reverberation effects from speech, but also for providing information about the acoustic environment. For example, such information can be used to estimate, based on the estimated acoustic parameters, the distance between the person speaking and a device receiving the speech input. The information can also be useful to the ASR engine itself (e.g., for model switching).

Advantageously, embodiments described herein provide spectral estimates for the reverberation parameters $T_{60}$ and DRR. Both parameters are estimated in a spectral manner, which results in more accurate estimation of the reverberation PSD.

There appears to be no spectral $T_{60}$ estimator described in the present literature on reverberation time estimation. Known methods estimate the frequency averaged $T_{60}$. The reverberation time, however, is known to be frequency dependent due to greater sound absorption of typical materials towards higher frequencies. For the same reason, the DRR can be considered to depend on frequency. Spectral estimation improves the accuracy of the estimate of the late reverberation PSD and thereby the performance of the reverberation suppressor.

Moreover, some $T_{60}$ estimators described in the literature require a training phase. The estimator described herein does not.

In U.S. Patent Appl. Publication US 2008/0292108 by Buck et al., entitled "Dereverberation System for Use in a Signal Processing Apparatus," it is suggested to estimate the reverberation time $T_{60}$ from the impulse response estimated by the Acoustic Echo Cancellation (AEC) filter. Estimation of the reverberation scaling (called "A" in US 2008/0292108) is explicitly excluded from the method described in US 2008/0292108. This, however, is part of the method described in U.S. Pat. No. 8,160,262 to Buck et al., entitled "Method for Dereverberation of an Acoustic Signal." Both methods rely on estimating the $T_{60}$ from the AEC, Advantageously, a dereverberation filter based on embodiments of the current invention does not need an AEC, as embodiments can estimate both of the room acoustic parameters, $T_{60}$ and DRR, simply based on the observed signal. This is of practical importance because obtaining the $T_{60}$ parameter from the AEC works as long as the AEC filter is long enough to capture the decay period, so that $T_{60}$ can be estimated. However, in practice, one wants to keep the AEC filter as short as possible to keep the CPU consumption low. A signal-based parameter estimation method, such as estimation method provided herein, overcomes these shortcomings. Therefore, embodiments of the current invention provide a part that is missing from the method described in U.S. Pat. No. 8,160,262 and that can enhance that method to work in cases that would otherwise be not be practicable.

Embodiments of the invention offer benefits to commercial applications of speech processing, for example, by increasing ASR robustness in reverberant environments, such as in living rooms or office spaces. Especially in the smart-home environment (or Internet-of-things (IoT) related projects), speech enhancement techniques that impose spatial constraints often cannot be used. Therefore, a reverberation suppressor without spatial selectivity (and that does not require multiple microphones) is of high interest.

Experimental data shows that speech signal enhancement accuracy can suffer more the higher $T_{60}$ is, and this effect can almost be compensated for completely given an accurate estimate of the reverberation PSD. The latter estimation problem can be addressed by embodiments of the present invention. Furthermore, reverberation suppression can also be used in a distant-talk, hands-free scenario (e.g., SKYPE® calls on TVs or mobile devices) to improve speech quality.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

1. Introduction

Room reverberation can severely degrade the performance of automatic speech recognition (ASR). Speech enhancement methods for suppression of late reverberation can therefore increase ASR robustness. Reverberation suppression methods typically rely on estimates of the parameters describing room acoustics. Common parameters are the reverberation time $T_{60}$ (also referred to herein as RT60) and the power ratio of the direct sound (dry) and the reverberation, referred to as Direct-to-Reverberant Ratio (DRR). Described herein are new estimation methods and systems for both $T_{60}$ and DRR. The methods and systems are useful for implementing a reverberation suppressor to improve ASR robustness in reverberant environments.

The reverberation time $T_{60}$ may correspond to the time that is needed for the reverberation to decay by about 60 dB. The DRR is a measure of the level of direct sound to late sound ("How loud is reverberation part relative to non-reverberation part.") In general, reverberation parameters, such as reverberation time $T_{60}$ and DRR, depend on room geometry and reflectivity of surfaces in the room. An estimate of $T_{60}$, DRR or both of a particular room is useful to gauge the quality and the intelligibility of speech observed in that room.

Figure 1:
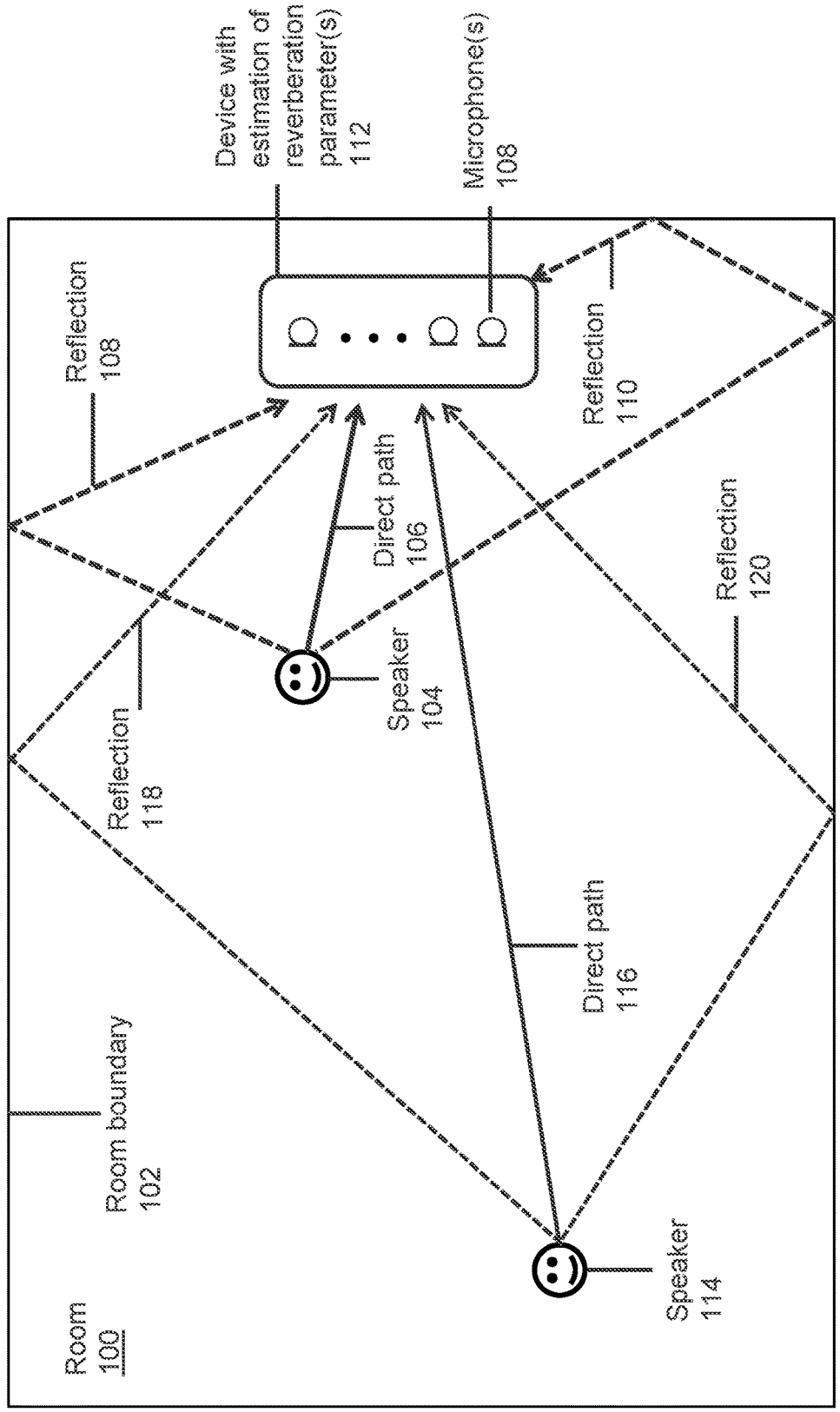
FIG. 1 is a schematic diagram of a room illustrating reverberation of acoustic signal components.

FIG. 1 illustrates an example environment in which embodiments of the present inventions can be deployed. FIG. 1 shows the generation of reverberation components of acoustic signals originating from two sources (e.g., speaking persons) 104 and 114 inside a room 100. The room 100 can be an office, a living room or a vehicle cabin. The acoustic signals are detected by a microphone 108, which may be a set of microphones, such as a microphone array. In the example illustrated, an array of M microphones is provided in a device 112 that is configured to estimate reverberation parameters. The acoustic signal of speaking person 104 has a direct path 106 sound component and reverberation components 108 and 110 that originate from sound reflected at a boundary 102 of the room. Similarly, acoustic signal of speaking person 114 has a direct path 116 sound component and reverberation components 118 and 120 that originate from sound reflected at boundary 102 of the room 100. The reflections at the room boundaries, such as walls or other room elements, produce signal components that result in a reverberation speech.

As shown in FIG. 1, speaker 104 is located closer to the microphone(s) 108 than speaker 114. Reverberation can alter the characteristics of a speech signal, which can be challenging for signal processing applications, such as source localization, speech recognition, and speaker verification. The detrimental effects of reverberation may be magnified as the distance between the speaker and the microphone(s) is increased. In the example shown, the distant speaker 114 may emanate signals that are more affected by reverberation than signals emanating from speaker 104 located closer to the microphone(s). Further, embodiments of the invention may be used to identify the location and/or distance of a speaker relative to the one or more microphones 108. As shown, the microphone(s) of device 112 pick up the direct sound 106, 116 as well as the reflected sound 108, 110, 118, and 120. The device can process the detected signals to estimate one or more reverberation parameters associated with the room. The device 112 can be a telephony device or a consumer device, such as a voice-controlled television set or an internet-connected digital assistant.

Figure 2:
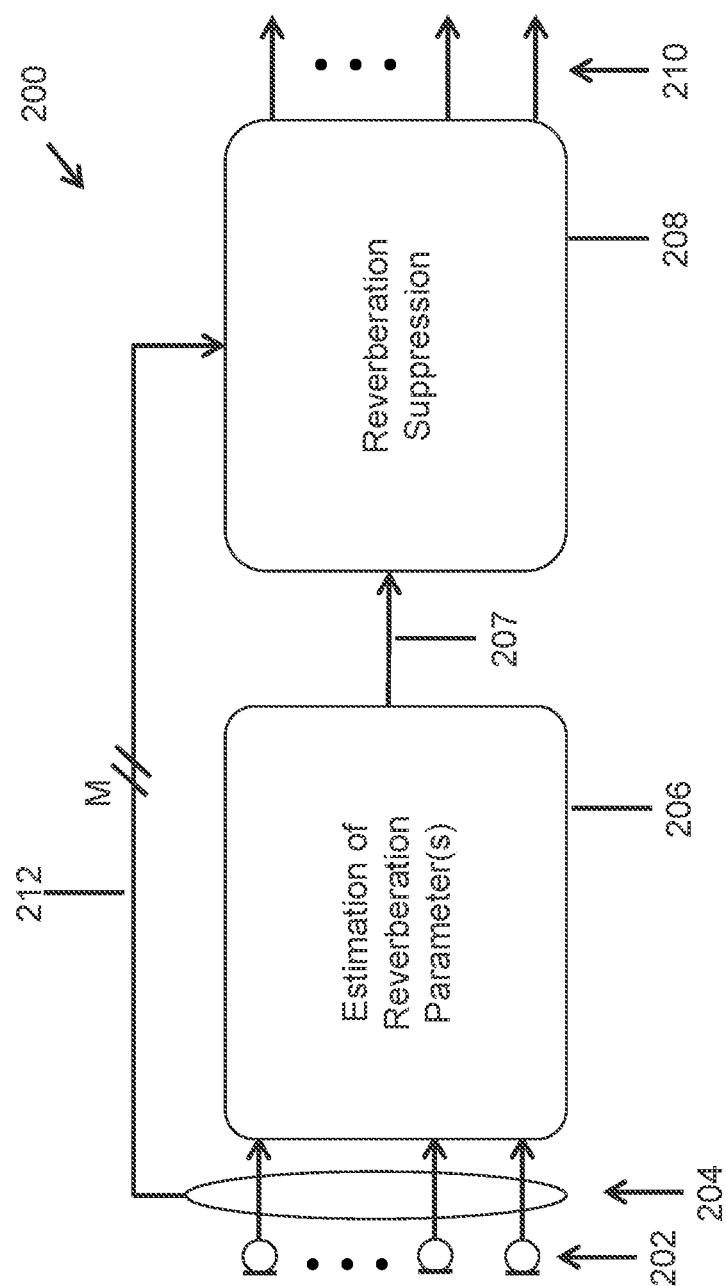
FIG. 2 is a schematic diagram of an example system for processing signals from one or more microphones, the system including an estimator for reverberation parameters and a reverberation suppressor.

FIG. 2 is a schematic diagram of an example system 200 for processing signals from one or more microphones including an estimator of reverberation parameters and a reverberation suppressor. The system 200 may, for example, be implemented in whole or in part in the device 112 of FIG. 1.

In FIG. 2, one or more microphones 202 provide M acoustic signals 204. An estimator 206 estimates at least one reverberation parameter 207 from the signals 204. The parameter(s) estimated are presented to a reverberation suppressor 208. The reverberation suppressor 208 also receives M acoustic signals from the microphones, as indicated at 212. The received signals 212 are processed using the reverberation parameter(s) 207, to suppress reverberation components of the signals. The processed signals 210 are output and can, for example, be used by another system, such as an automatic speech recognizer or the like.

A method of estimating estimation parameters is provided. The method is based on a statistical model for the impulse response of the acoustic channel between a user's mouth and a microphone (Generalized Polack's Model). Based on this, the late reverberation PSD is estimated based on the (observable) reverberant PSD of the microphone signal and depends on DRR and RT60—in each frequency. An equation for estimation the later reverberation PSD in this way has been described by Habets [1]. Here, it is used for a different purpose, namely to obtain parameters to estimate room reverberation parameters. The estimation process includes a first-order recursive filter and is, therefore, highly efficient.

In order to obtain accurate estimates, the filter's parameters can be adjusted. In an embodiment of the present invention, this is done directly by minimizing the Mean-Squared Logarithmic Error using a gradient descent procedure for adaptive recursive filters. In order to adjust the filter only with respect to late reverberation, updates are constrained to decay-only periods, which are detected in a time-frequency selective manner at first. The update method is thereby protected from false adaptations due to the presence of the early speech components.

Thus, a feature of the described method is to use the model as proposed by Habets [1] to adaptively minimize the Mean-Squared-Logarithmic-Error between the estimated and the observed reverberant PSD during decay-only periods.

Adaptation of a recursive filter can be accomplished using the so called "Recursive Prediction Error" method described by Shynk [2]. Alternatively, a so-called "Pseudo Linear Regression" method together with a direct-form 2 implementation of the filter may be used. Other methods may be used, provided they can update the parameters during decay-only periods.

The methods described herein result in update rules for the RT60 parameter that are independent of the DRR. Therefore, the RT60 can be found independently. The RT60 estimate can then be provided to the corresponding DRR estimator, which at the same time can generate the final spectrally optimized late reverberant PSD estimate. This can then be used in a reverberation suppressor.

The described methods apply to a single microphone channel and can be extended to the case of a microphone array (providing multiple channels) to improve the estimation accuracy. A microphone array typically includes multiple microphones that are in close proximity. Such an arrangement provides for signals that are different yet similar enough so as not to result in large deviations in the respective PSDs. Microphone arrays allow for sampling acoustic signals using the same clock. Typically, beamforming is employed with microphone arrays to improve signal quality.

Figure 3:
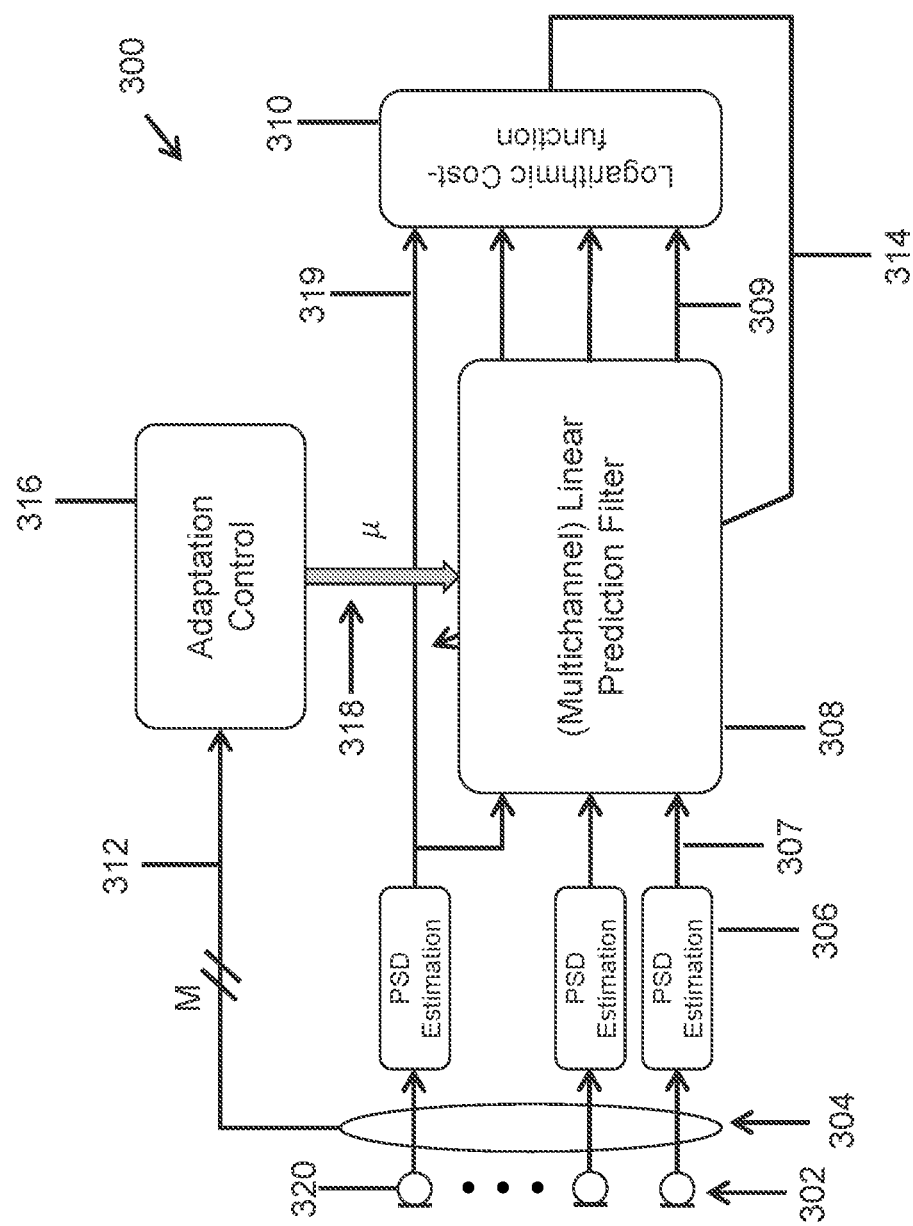
FIG. 3 is a schematic diagram illustrating an example system for estimating one or more reverberation parameters by performing multichannel linear prediction of Power Spectral Densities (PSDs).

The estimation approach described here is based on the realization that power spectral density (PSD) of the late reverberation can be predicted based on a parametric estimator. A gradient descent adaptation during reverberation-only passages is performed to find the optimal parameters. It was found to be useful to minimize the Mean-Squared Logarithmic Error (MSLE). FIG. 3 depicts an example of the basic arrangement.

FIG. 3 illustrates an example system 300 for estimating one or more reverberation parameters. The system 300 includes several modules, such as signal processing modules 306, prediction filter 308 and adaptation controller 316. One or more microphones 302, for example a microphone array, provide signals 304, which are processed by the system 300. The microphones 302 can be part of the system 300 or may be external. For each signal 304, a power spectral density (PSD) 307 is estimated at estimation module 306. In one example, PSD is estimated over a range of 0-8 kHz, for signals sampled at 16 kHz. Each PSD estimated can be computed for a frame. A typical frame can be 10 milliseconds in duration.

System 300 includes an adaptive, parametric, linear prediction filter 308 that has one or more PSD estimates 307 of signals 304 of one or more channels as inputs. In the example shown in FIG. 3, a multi-channel prediction filter 308 is shown, but a single-channel configuration can also be used. The prediction filter 308 estimates at least one parameter related to reverberation time and can further estimate an additional parameter related to the ratio of power of direct sound and power of reverberation. These estimated parameters can be translated into reverberation time $T_{60}$ and Direct-to-Reverberant Ratio (DRR). The prediction filter is being adapted (314) during a period of reverberation by minimizing a cost function 310. The cost function is minimized on the basis of PSD estimates 309, obtained with the prediction filter 308, and PSD estimate 319, obtained directly from a reference microphone 320. Preferably, the cost function is independent of power of the signals. More preferably, the cost function is logarithmic, as further described below.

As illustrated in FIG. 3, the adaptation controller 316 receives as inputs 312 the M signals from the microphones 302. The adaptation controller is configured to determine the period of reverberation from the inputs 312 and to provide a control output 318, including a step size parameter μ. A step size of μ=0 indicates no reverberation, which causes the filter not to be updated. Adaptation of the prediction filter 308 includes using a gradient descent approach, as further described below, which can operate according to the step size μ provided by the adaptation control module 316. Adaptation control serves to exclude from adaptation periods of no reverberation and to focus on periods of reverberation only. The adaptation control is common to the estimation of parameters to obtain RT60 and DRR estimates.

2. Linear Prediction of Power Spectral Densities

Figure 4:
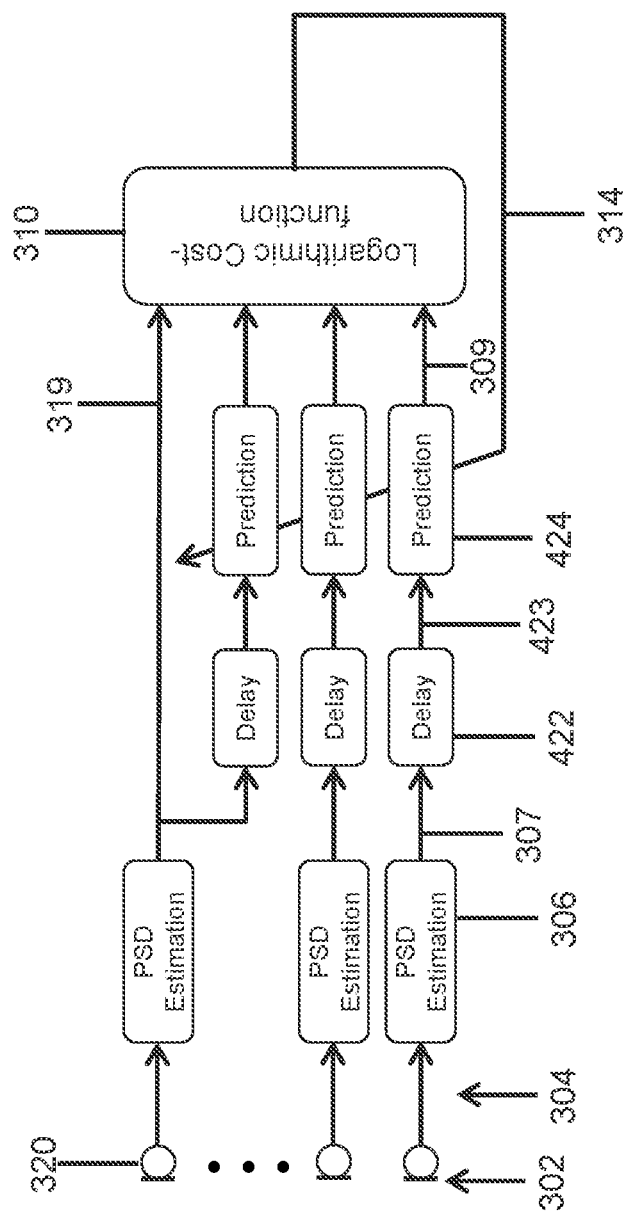
FIG. 4 is a schematic diagram further illustrating multichannel linear prediction of Power Spectral Densities (PSDs).

FIG. 4 shows details of the prediction structure. In general, multiple microphones 302 can be used, whereas the single microphone case is also covered. Typically, one of the microphones 302 is configured as a reference microphone 320. At first, the PSD for each of the M microphone signals 304 is estimated (306), which can, for instance, be done using recursive smoothing of the magnitude squares of the complex valued spectra. These PSD estimates 307 are the input to the parameter estimation process 308 (FIG. 3). The adaptation control 316 (FIG. 3) determines those time-frequency points that are considered to be reverberation. The gradient descent is carried out only for those instances that are determined by the adaptation control to be periods of reverberation.

As illustrated in FIG. 4, the current PSD estimates 307 are delayed (422), e.g., by a delay D, resulting in delayed PSD estimates 423. In one example, the delay is 4 frames (e.g., 40 milliseconds). The delayed (past) PSD estimates 423 are filtered (prediction filter 424), such that the filter output 309 matches the current PSD estimate 319 for reference microphone 320 during reverb only passages. The filter parameters are updated (314) based on mean squared log error minimization, as further described below. Thus, the input PSDs are delayed to predict the current PSD. In the implementation illustrated in FIG. 4, the delay operator 422 is different from the prediction operator 424.

Two basic choices for the filter design are considered. The first one is a 2-Dimensional IIR filter according to the late reverberant PSD estimator proposed by Habets in [1]. The second one is a parametric FIR filter with only one parameter (decay). Finding the parameters of an IIR filter generally raises the problem of infinitely long gradients (due to the filter being recursive). This problem is addressed here by employing the recursive prediction error (RPE) principle described by Shynk [2]. In the case of the FIR predictor, this problem does not exist.

The choice parameter to estimate can determine the choice of filter design. For example, the particular FIR filter described herein estimates $T_{60}$ but not DRR. However, the FIR filter converges faster than the IIR filter. With regards to DRR, the IIR filter only needs to store one PSD value. An FIR filter, if implemented to allow for DRR estimation, would need more storage.

All quantities used in the following depend on the time- or frame-index k. Furthermore, all quantities generally also depend on the frequency but the frequency index is omitted for ease of notation. Note that all methods described here could also be applied to broadband powers. In the broadband case, one considers the entire power of the speech signal. Typically, broadband is considered 0-8 kHz for speech signals. Within the 0-8 kHz range, the room spectral parameters (e.g., acoustic parameters) are expected to vary with frequence. A frequency dependent implementation would give access to the frequency dependency of the estimated parameters, which may or may not be desired depending on the application. It is understood that a frequency selective implementation is also possible, where averaging of the spectral parameters is carried out to obtain estimates for the broadband parameters.

3. Habets' LRSV-Estimator as Prediction Filter

The PSD $\Phi_{xx}^m(k)$ of the reverberant component in the m-th microphone in frame k can be estimated based on a generalization of the room impulse response (RIR) model described by Polack [3]. In Polack's model, the RIR is described as an exponentially decaying noise process and is hence dependent on the decay parameter G. The generalization of this RIR model, termed Late Reverberant Spectral Variance (LRSV) Estimator, was proposed by Habets in [1] and considers the fact that the reverberation can have lower power envelope as compared to the early reflections. Physically this may be the case if the speaker is close to the microphone and/or the room is large. Therefore, another parameter κ is introduced in the model.

Parameter G relates to reverberation time RT60 and κ relates to DRR. RT60 and DDR can be derived from G and κ.

Figure 5:
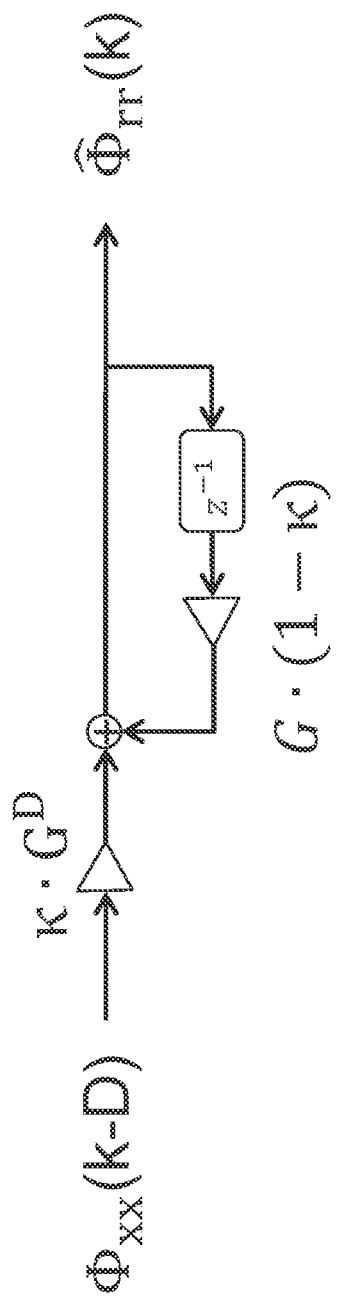
FIG. 5 illustrates an example first order parametric IIR prediction filter that can be used in embodiments of the present invention.

The generalized model allows for deriving an optimal estimate for the late reverberation PSD $\Phi_{rr}^m(k)$ based on the delayed reverberant input PSD $\Phi_{xx}^m(k-D)$. It is useful here to note that the reverberant microphone PSD can be used to estimate the PSD of the reverb because the reverberant PSD is observable and the PSD estimation can be viewed as a prediction. This predictor is graphically shown in FIG. 5 and reads as follows:

$$\hat{\Phi}_{rr}^m(k) = \kappa(k) \cdot G^D(k) \cdot \Phi_{xx}^m(k-D) + \{1-\kappa(k)\} \cdot G(k) \cdot \hat{\Phi}_{rr}^m(k-1) \quad (1)$$

In embodiments of the present invention, this equation is used as a predictor and the estimated PSDs are compared to the PSD of the reference microphone to generate the log error:

$$E_m(k) = \ln \Phi_{xx}^{ref}(k) - \ln \hat{\Phi}_{rr}^m(k) \quad (2)$$

with the cost function given as the magnitude square:

$$J_m(k) = E_m^2(k) = \{\ln \Phi_{xx}^{ref}(k) - \ln \hat{\Phi}_{rr}^m(k)\}^2. \quad (3)$$

The cost function to be minimized is the mean of the squared errors across M microphones (Mean-Squared-Log-Error):

$$J(k) = \frac{1}{M} \sum_{m=1}^{M} J_m(k) = \frac{1}{M} \sum_{m=1}^{M} \{\ln \Phi_{xx}^{ref}(k) - \ln \hat{\Phi}_{rr}^m(k)\}^2. \quad (4)$$

3.1 Partial Derivative with Respect to (w.r.t.) the Decay Parameter

It can be shown that the partial derivative of J (k) w.r.t. the logarithm of the parameter G(k) reads.

$$\boxed{\frac{\partial J(k)}{\partial \ln G(k)} = -\frac{2}{M} \cdot \sum_{m=1}^{M} E_m(k) \cdot \frac{\gamma^m(k)}{\hat{\Phi}_{rr}^m(k)}.} \quad (5)$$

For derivation details, please see Appendix. The quantity $$\gamma^m(k) = \frac{\partial \hat{\Phi}_{rr}^m(k)}{\partial \ln G(k)} \quad (5)$$

denotes the partial derivative of the estimated reverberant PSD for the m-th microphone in the k-th frame w.r.t. the logarithm of the decay parameter in the k-th frame, and is computed as:

$$\gamma^m(k) = \frac{\partial}{\partial \ln G(k)} \{ \kappa(k) \cdot G^D(k) \cdot \Phi_{xx}^m(k-D) + \{1 - \kappa(k)\} \cdot G(k) \cdot \hat{\Phi}_{rr}^m(k-1) \} \quad (6)$$

$$= D \cdot \kappa(k) \cdot G^D(k) \cdot \Phi_{xx}^m(k-D) + \{1 - \kappa(k)\} \cdot G(k) \cdot \hat{\Phi}_{rr}^m(k-1) + \{1 - \kappa(k)\} \cdot G(k) \cdot \frac{\partial \hat{\Phi}_{rr}^m(k-1)}{\partial \ln G(k)}.$$

The part $$\frac{\partial \hat{\Phi}_{rr}^m(k-1)}{\partial \ln G(k)}$$

is unknown, which is why the recursive prediction error (RPE) principle [2] is employed. In the RPE principle, it is assumed that $$\frac{\partial \hat{\Phi}_{rr}^m(k-1)}{\partial \ln G(k)} = \gamma^m(k-1)$$

which makes Equation 6 a recursive estimate for the derivative.

$$\gamma^m(k) = D \cdot \kappa(k) \cdot G^D(k) \cdot \Phi_{xx}^m(k-D) + \{1 - \kappa(k)\} \cdot G(k) \cdot \hat{\Phi}_{rr}^m(k-1) + \{1 - \kappa(k)\} \cdot G(k) \cdot \gamma^m(k-1). \quad (7)$$

In contrast to Equation 6, this recursive form can be evaluated and, therefore, the gradient for the recursive filter can be compute. For M microphones we have:

$$\sum_{m=1}^{M} \gamma^m(k) = D \cdot \kappa(k) \cdot G^D(k) \cdot \sum_{m=1}^{M} \Phi_{xx}^m(k-D) + \{1 - \kappa(k)\} \cdot G(k) \cdot \sum_{m=1}^{M} \hat{\Phi}_{rr}^m(k-1) + \{1 - \kappa(k)\} \cdot G(k) \cdot \sum_{m=1}^{M} \gamma^m(k-1). \quad (8)$$

This result is inserted into Equation 5 to obtain the partial derivative $$\frac{\partial J(k)}{\partial \ln G(k)}.$$

3.2 Partial Derivative w.r.t. The Scaling Parameter

The partial derivative of $J(k)$ w.r.t. $\kappa(k)$ is computed as:

$$\frac{\partial J(k)}{\partial \ln \kappa(k)} = -\frac{2}{M} \cdot \sum_{m=1}^{M} E_m(k) \cdot \frac{\partial^m(k)}{\hat{\Phi}_{rr}^m(k)}, \quad (9)$$

with $$\delta^m(k) = \frac{\partial \hat{\Phi}_{rr}^m(k)}{\partial \ln \kappa(k)}$$

computed using the same RPE principle as for the decay parameter G (see above):

$$\delta^m(k) = \frac{\partial}{\partial \ln \kappa(k)} \{ \kappa(k) \cdot G^D(k) \cdot \Phi_{xx}^m(k-D) + \{1 - \kappa(k)\} \cdot G(k) \cdot \hat{\Phi}_{rr}^m(k-1) \} \quad (10)$$

$$= \kappa(k) \cdot G^D(k) \cdot \Phi_{xx}^m(k-D) + \{1 - \kappa(k)\} \cdot G(k) \cdot \hat{\Phi}_{rr}^m(k-1) + \{1 - \kappa(k)\} \cdot G(k) \cdot \delta^m(k-1).$$

The sum across M microphones is given as:

$$\sum_{m=1}^{M} \delta^m(k) = \kappa(k) \cdot G^D(k) \cdot \sum_{m=1}^{M} \Phi_{xx}^m(k-D) - \kappa(k) \cdot G(k) \cdot \sum_{m=1}^{M} \hat{\Phi}_{rr}^m(k-1) + \{1 - \kappa(k)\} \cdot G(k) \cdot \sum_{m=1}^{M} \delta^m(k-1), \quad (11)$$

and plugged into Equation 9.

3.3 Gradient and its Efficient Implementation

The updated parameters can now be computed as:

$$\ln G(k+1) = \ln G(k) - \frac{\mu(k)}{2} \cdot \frac{\partial J(k)}{\partial \ln G(k)} \quad (12)$$

$$\ln \kappa(k+1) = \ln \kappa(k) - \frac{\mu(k)}{2} \cdot \frac{\partial J(k)}{\partial \ln \kappa(k)}$$

or alternatively as:

$$G(k+1) = G(k) \cdot e^{\left(-\frac{\mu(k)}{2} \cdot \frac{\partial J(k)}{\partial \ln G(k)}\right)} \quad (13)$$

$$\kappa(k+1) = \kappa(k) \cdot e^{\left(-\frac{\mu(k)}{2} \cdot \frac{\partial J(k)}{\partial \ln \kappa(k)}\right)}$$

and can be approximated for small values of the step size $\mu(k)$ using Taylor's series ($e^a = 1 + a \, \forall \, a \ll 1$) as:

$$G(k+1) = G(k) \cdot \left( 1 + \frac{\mu(k)}{M} \cdot \sum_{m=1}^{M} E_m(k) \cdot \frac{\gamma^m(k)}{\hat{\Phi}_{rr}^m(k)} \right) \quad (14)$$

$$\kappa(k+1) = \kappa(k) \cdot \left( 1 + \frac{\mu(k)}{M} \cdot \sum_{m=1}^{M} E_m(k) \cdot \frac{\delta^m(k)}{\hat{\Phi}_{rr}^m(k)} \right)$$

The last step makes the parameter estimation computationally feasible as the exponential term is no longer required. The step size $\mu(k)$ is the result of the adaptation control unit 316 shown in FIG. 3.

4. Parametric FIR-Filter as Prediction Filter

Figure 6:
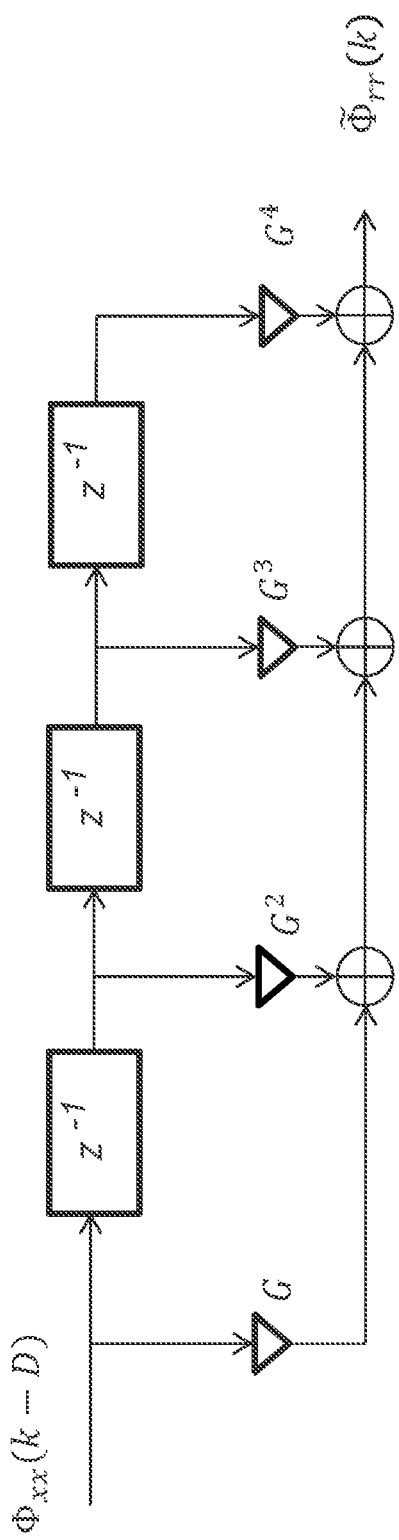
FIG. 6 illustrates an example parametric FIR prediction filter for length L=4, which can be used in embodiments of the present invention.

As mentioned in Section 2 above, a second option for generating a prediction is a parametric FIR filter. In particular, an L-tap filter whose coefficients are dependent on the decay parameter is considered. A graphical representation of a suitable parametric FIR filter is shown in FIG. 6.

Each microphone PSD is filtered using an L-tap FIR filter to generate an estimate for the $(L-\eta)$-th tap-input, where $\eta \in [0, L-2]$:

$$\Phi_{rr}^m(k-\eta) = \frac{\sum_{l=\eta+1}^{L-1} \mu_m(k-l) \cdot \Phi_{xx}^m(k-l) \cdot G^{l-\eta}(k)}{\sum_{l=\eta+1}^{L-1} \mu_m(k-l)}. \quad (15)$$

Here, $\mu_m(k)$ is the output of the adaptation control unit and goes to 0 if $\Phi_{xx}^m(k)$ is detected as not being part of a decay. The log error when predicting the $(L-\eta)$-th tap-input of the reference microphone is then given as:

$$E_{m\eta}(k) = \ln \frac{\Phi_{xx}^{ref}(k-\eta)}{\Phi_{rr}^m(k-\eta)} = \ln \Phi_{xx}^{ref}(k-\eta) - \ln\left(\frac{\sum_{l=\eta+1}^{L-1} \mu_m(k-l) \cdot \Phi_{xx}^m(k-l) \cdot G^{l-\eta}(k)}{\sum_{l=\eta+1}^{L-1} \mu_m(k-l)}\right). \quad (16)$$

The cost functions corresponding to the error in Equation 16 is given as $J_{m\eta}(k) = E_{m\eta}^2(k)$, with the cost function to be minimized computed as a weighted average of $J_{m\eta}(k)$ across M microphones and L tap-indices to give the Mean-Squared-Log-Error:

$$\bar{J}(k) = \frac{\sum_{m=1}^{M} \sum_{\eta=0}^{L-2} w_m(\eta) \cdot J_{m\eta}(k)}{\sum_{m=1}^{M} \sum_{\eta=0}^{L-2} w_m(\eta)} = \frac{1}{W} \cdot \sum_{m=1}^{M} \sum_{\eta=0}^{L-2} w_m(\eta) \cdot E_{m\eta}^2(k), \quad (17)$$

where $W = \sum_{m=1}^{M} \sum_{\eta=0}^{L-2} w_m(\eta)$ is the normalization term. The weights $w_m(\eta)$ serve the purpose of determining which prediction errors $E_{m\eta}$ are relevant for the computation of the cost function $\bar{J}$ and are given as:

$$w_m(\eta) = \begin{cases} 0, & \text{if } \Phi_{rr}^m(k-\eta) = 0 \\ \mu_m(k-\eta), & \text{else} \end{cases}. \quad (18)$$

Using these weights enables one to dynamically change the FIR filter length in the range $L \in [2, L_{max}]$ based on the duration of the decays observed in the microphone signals. Also, it makes the decay parameter estimation robust to outliers in the decaying parts of the microphone spectrum.

Figures 7A, 7B:
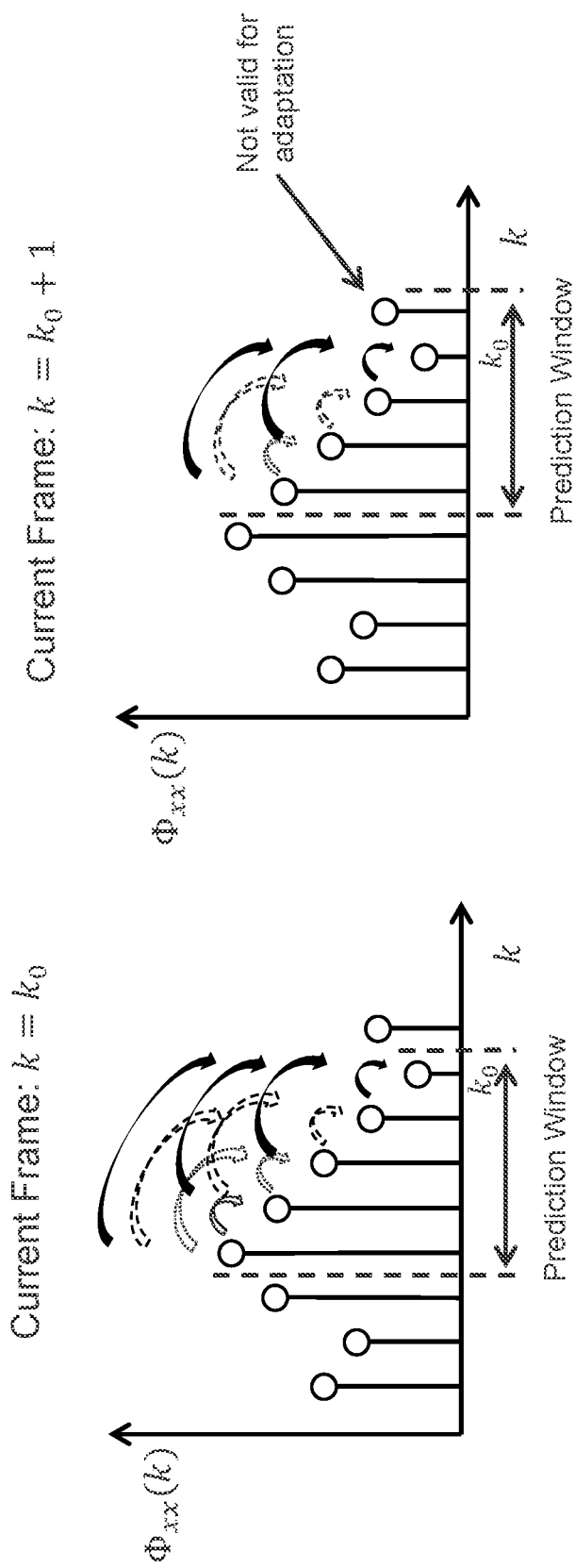
FIGS. 7A and 7B each illustrate example FIR predictions of a PSD at a current point (frame) in time based on past values.

FIGS. 7A-7B illustrate this principle. Note that in the case of L=2 and M=1 a very simple prediction (across one frame) is obtained.

FIG. 7A illustrates prediction of PSD at a current time frame $k_0$ based on past PSD estimates. The prediction window is a result of the adaptation control. Certain frames correspond to decaying parts of the PSD values, which are used for predictions. Here, a prediction window is depicted that requires storing of 4 previous PSD values to predict the PSD value at the current time frame. This is illustrated by the black arrows in FIG. 7A. The predicted value at the current time frame $k_0$ is derived from the values at $k_0-1$, $k_0-2$, $k_0-3$ and $k_0-4$. Dashed, dotted and solid line arrows illustrate the use of past values of PSDs to derive values at $k_0-1$, $k_0-2$, $k_0-3$. These values are computed to improve the robustness of the prediction filter.

In FIG. 7B, the adaptation control determined that the frame $k=k_0+1$ includes a non-decaying PSD value. Thus, the value is not used for adaptation of the prediction filter.

In the Appendix, it is shown in detail how the gradient for $\bar{J}(k)$ is derived. As a result, we obtain:

$$\frac{\partial \bar{J}(k)}{\partial \ln G(k)} = \frac{-2}{W} \cdot \sum_{m=1}^{M} \sum_{\eta=0}^{L-2} w_m(\eta) \cdot \quad (19)$$

$$E_{m\eta}(k) \cdot \left[ \frac{\sum_{l=\eta+1}^{L-1} (l-\eta) \cdot \mu_m(k-l) \cdot \Phi_{xx}^m(k-l) \cdot G^{l-\eta}(k)}{\sum_{l=\eta+1}^{L-1} \mu_m(k-l) \cdot \Phi_{xx}^m(k-l) \cdot G^{l-\eta}(k)} \right].$$

The updated decay parameter can now be computed using a global step size $\mu(k)$ as:

$$\ln G(k+1) = \ln G(k) - \frac{\mu(k)}{2} \cdot \frac{\partial \bar{J}(k)}{\partial \ln G(k)}. \quad (20)$$

Here, the same Taylor-series expansion as above can be applied to achieve an efficient update:

$$G(k+1) = G(k) \cdot \left(1 - \frac{\mu(k)}{2} \cdot \frac{\partial \bar{J}(k)}{\partial \ln G(k)}\right) \quad (21)$$

In the special case of L=2 and M=1, the update rule reduces to:

$$G(k+1) = G(k) \cdot \left\{1 + \mu(k) \cdot \ln\left(\frac{\Phi_{xx}(k)}{\Phi_{xx}(k-1) \cdot G(k)}\right)\right\}. \quad (22)$$

5. Adaptation Control

The adaptation of the prediction filters should only be carried out when it has been detected that only reverberation is present in the signals (see also FIGS. 7A-7B). Otherwise, the early reverberation or direct sound components act as noise to the adaptation. The adaptation control can at least be based on two principles.

The first adaptation principle is the use of a Direct-to-Reverberant-Ratio estimator, for example the one proposed by Thiergart in [4]. This provides frame based spectral information about the presence of direct sound components over diffuse sound components. These are described by means of their coherence functions (the direct parts being coherent, while the late parts are modeled as diffuse). This metric can be used to stop the adaptation whenever early parts are present and the adaptation can be executed whenever there is diffuse sound energy greater than the background noise (that should be the late reverb). This control principle relies on at least two microphones (multi-microphone technique) because the coherence functions are required.

The second adaptation principle that can be used here is decay detection. Decaying signal components can be detected per sub-band by comparing two heavily smoothed PSD estimates. The first one would be delayed by D frames and the second one corresponds to the current frame. Whenever the delayed version is greater than the non-delayed version, a decay is present in the signal. Refined versions of this simple mechanism can be created as well.

The multi-channel and the single channel decay detectors can, of course, also be combined to create the final adaptation control in the multi-channel case.

6. Features and Example Implementation

The following are advantageous features of embodiments of the described invention:

Using a parametric (multichannel) prediction principle to predict the Late Reverberation PSD.

Minimizing the Mean-Squared Log-Error to find the predictor parameters.

Using an IIR-Predictor according to the LRSV Estimate proposed by Habets.

Using the RPE principle to compute the gradient of the IIR-Predictor.

Using a parametric FIR-Predictor to estimate the decay parameter which can be translated to an estimate of the reverberation time $T_{60}$.

When using the FIR-predictor, dynamically change the length of the filter in the range $L \in [2, L_{max}]$ taps based on the duration of the decay observed in the microphone signals.

Making the decay parameter G estimation robust to outliers in the decaying parts of the microphone spectrum.

Figure 8:
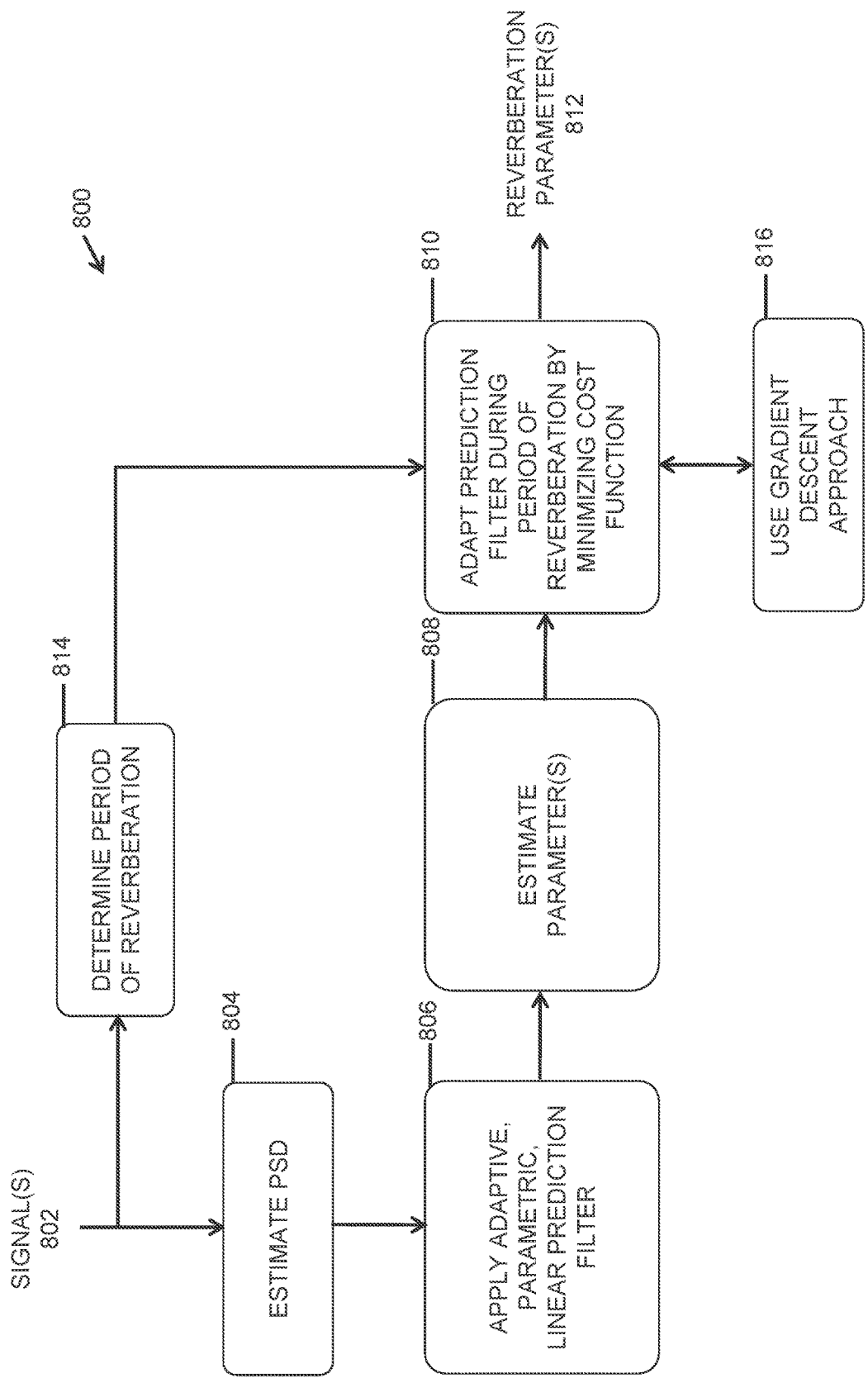
FIG. 8 is a flow chart illustrating an example process for estimating one or more reverberation parameters.

FIG. 8 is a flow chart 800 illustrating an example process and system for estimating one or more reverberation parameters. At 802, one or more acoustic signals are provided, for example, by an array of microphones. At 804, the power spectral density (PSD) is estimated for each signal. At 806, an adaptive, parametric prediction filter is applied. The prediction filter may be configured for single-channel or multi-channel processing of the PSDs of the acoustic signals. At 808, the prediction filter estimates one or more reverberation parameters, including, for example, any of the reverberation parameters described herein. At 810, the prediction filter is adapted during a period of reverberation by minimizing a cost function, as described above. Preferably, the cost function is logarithmic. A gradient descent approach (816) can be used to minimize the cost function, as described above. The period(s) of reverberation can be determined (814), for example, by an adaptation controller that processes the acoustic signals provided at 802. At 812, the one or more reverberation parameters estimated are provided as an output.

A system in accordance with embodiments the invention has been described which estimates one or more reverberation parameters. Components of such a system, for example, a linear prediction filter, an adaptation controller and other systems discussed herein may, for example, be a portion of program code, operating on a computer processor.

Portions of the above-described embodiments of the present invention can be implemented using one or more computer systems, for example, to permit estimating at least one reverberation parameter related to reverberation time. For example, the embodiments may be implemented using hardware, software or a combination thereof. When implemented in software, the software code can be stored on any form of non-transient computer-readable medium and loaded and executed on any suitable processor or collection of processors, whether provided in a single computer or distributed among multiple computers.

Further, it should be appreciated that a computer may be embodied in any of a number of forms, such as a rack-mounted computer, desktop computer, laptop computer, or tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-described functions of these embodiments. As used herein, the term "computer-readable medium" encompasses only a non-transient computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, RAM, flash memory, or other type of computer memory), magnetic disc or tape, optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

7. Appendix 7.1 Derivation of the IIR Gradient

The partial derivative of J(k) w.r.t. the logarithm of the parameter G(k) can be computed as:

$$\frac{\partial J(k)}{\partial \ln G(k)} = \frac{\partial}{\partial \ln G(k)} \left( \frac{1}{M} \cdot \sum_{m=1}^{M} J_m(k) \right) \quad (23)$$

$$= \frac{1}{M} \cdot \sum_{m=1}^{M} \frac{\partial J_m(k)}{\partial \ln G(k)}$$

$$= \frac{1}{M} \cdot \sum_{m=1}^{M} \frac{\partial E_m^2(k)}{\partial \ln G(k)}$$

$$= \frac{2}{M} \cdot \sum_{m=1}^{M} E_m(k) \cdot \frac{\partial E_m(k)}{\partial \ln G(k)}$$

$$= -\frac{2}{M} \cdot \sum_{m=1}^{M} E_m(k) \cdot \frac{\partial \ln \hat{\Phi}_{rr}^m(k)}{\partial \ln G(k)}$$

$$= -\frac{2}{M} \cdot \sum_{m=1}^{M} E_m(k) \cdot \frac{1}{\hat{\Phi}_{rr}^m(k)} \cdot \frac{\partial \hat{\Phi}_{rr}^m(k)}{\partial \ln G(k)}$$

$$\frac{\partial J(k)}{\partial \ln G(k)} = -\frac{2}{M} \cdot \sum_{m=1}^{M} E_m(k) \cdot \frac{\gamma^m(k)}{\hat{\Phi}_{rr}^m(k)}$$

7.2 Derivation of the FIR Gradient

The partial derivative of $J_{m\eta}(k)$ w.r.t. the logarithm of the parameter G(k) is computed as:

$$\frac{\partial J_{m\eta}(k)}{\partial \ln G(k)} = \frac{\partial E_{m\eta}^2(k)}{\partial \ln G(k)} = 2 \cdot E_{m\eta}(k) \cdot \frac{\partial E_{m\eta}(k)}{\partial \ln G(k)}. \quad (24)$$

$$\frac{\partial E_{m\eta}(k)}{\partial \ln G(k)} = \frac{\partial}{\partial \ln G(k)} \left\{ \ln \Phi_{xx}^{ref}(k-\eta) - \ln \left( \frac{\sum_{l=\eta+1}^{L-1} \mu_m(k-l) \cdot \Phi_{xx}^m(k-l) \cdot G^{l-\eta}(k)}{\sum_{l=\eta+1}^{L-1} \mu_m(k-l)} \right) \right\}$$

$$= -\frac{\partial}{\partial \ln G(k)} \left\{ -\ln \sum_{l=\eta+1}^{L-1} \mu_m(k-l) + \ln \left( \sum_{l=\eta+1}^{L-1} \mu_m(k-l) \cdot \Phi_{xx}^m(k-l) \cdot G^{l-\eta}(k) \right) \right\}$$

$$= -\frac{\partial}{\partial \ln G(k)} \left\{ 0 + \ln \left( \sum_{l=\eta+1}^{L-1} \mu_m(k-l) \cdot \Phi_{xx}^m(k-l) \cdot G^{l-\eta}(k) \right) \right\}$$

$$= -\frac{\partial}{\partial \ln G(k)} \left\{ \ln \left( \sum_{l=\eta+1}^{L-1} \mu_m(k-l) \cdot \Phi_{xx}^m(k-l) \cdot G^{l-\eta}(k) \right) \right\}$$

$$= -\frac{\frac{\partial}{\partial \ln G(k)} \left\{ \sum_{l=\eta+1}^{L-1} \mu_m(k-l) \cdot \Phi_{xx}^m(k-l) \cdot G^{l-\eta}(k) \right\}}{\sum_{l=\eta+1}^{L-1} \mu_m(k-l) \cdot \Phi_{xx}^m(k-l) \cdot G^{l-\eta}(k)}$$

$$= -\frac{\sum_{l=\eta+1}^{L-1} \mu_m(k-l) \cdot \Phi_{xx}^m(k-l) \cdot \frac{\partial G^{l-\eta}(k)}{\partial \ln G(k)}}{\sum_{l=\eta+1}^{L-1} \mu_m(k-l) \cdot \Phi_{xx}^m(k-l) \cdot G^{l-\eta}(k)}$$

$$= -\frac{\sum_{l=\eta+1}^{L-1} (l-\eta) \cdot \mu_m(k-l) \cdot \Phi_{xx}^m(k-l) \cdot G^{l-\eta}(k)}{\sum_{l=\eta+1}^{L-1} \mu_m(k-l) \cdot \Phi_{xx}^m(k-l) \cdot G^{l-\eta}(k)}$$

$$\frac{\partial J_{m\eta}(k)}{\partial \ln G(k)} = -2 \cdot E_{m\eta}(k) \cdot \frac{\sum_{l=\eta+1}^{L-1} (l-\eta) \cdot \mu_m(k-l) \cdot \Phi_{xx}^m(k-l) \cdot G^{l-\eta}(k)}{\sum_{l=\eta+1}^{L-1} \mu_m(k-l) \cdot \Phi_{xx}^m(k-l) \cdot G^{l-\eta}(k)}. \quad (25)$$

The gradient for J(k) can be computed using the results from Equations 17 and 25 as:

$$\frac{\partial \overline{J}(k)}{\partial \ln G(k)} = \frac{\partial}{\partial \ln G(k)} \left( \frac{1}{W} \cdot \sum_{m=1}^{M} \sum_{\eta=0}^{L-2} w_m(\eta) \cdot J_{m\eta}(k) \right) \quad (26)$$

$$= \frac{1}{W} \cdot \frac{\partial}{\partial \ln G(k)} \left( \sum_{m=1}^{M} \sum_{\eta=0}^{L-2} w_m(\eta) \cdot J_{m\eta}(k) \right)$$

$$= \frac{1}{W} \cdot \sum_{m=1}^{M} \sum_{\eta=0}^{L-2} w_m(\eta) \cdot \frac{\partial J_{m\eta}(k)}{\partial \ln G(k)}$$

-continued $$\frac{\partial \bar{J}(k)}{\partial \ln G(k)} = \frac{-2}{W} \cdot \sum_{m=1}^{M} \sum_{\eta=0}^{L-2} w_m(\eta) \cdot$$

$$E_{m\eta}(k) \cdot \left[ \frac{\sum_{l=\eta+1}^{L-1} (l-\eta) \cdot \mu_m(k-l) \cdot \Phi_{xx}^m(k-l) \cdot G^{l-\eta}(k)}{\sum_{l=\eta+1}^{L-1} \mu_m(k-l) \cdot \Phi_{xx}^m(k-l) \cdot G^{l-\eta}(k)} \right].$$

REFERENCES

[1] E. A. P. Habets, "Speech dereverberation using statistical reverberation models", in Speech Dereverberation, P. A. Naylor and N. D. Gaubitch, Springer, London, 2010, ch. 3, pp. 57-93.

[2] J. J. Shynk, "Adaptive IIR Filtering", IEEE ASSP Magazine, vol. 6, no. 2, pp 4-21, April 1989.

[3] J. Polack, "La transmission de l'énergie sonore dans les salles", Dissertation, Université du Maine, 1988.

[4] O. Thiergart, G. D. Galdo and E. A. P Habets, "Signal to Reverberant Ratio Estimation based on the Complex Spatial Coherence Between Omnidirectional Microphones," Proceedings of International Conference on Acoustics Speech and Signal Processing, 2012 (ICASSP 2012).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. It should also be appreciated that the various technical features of the embodiments that have been described may be combined in various ways to produce numerous additional embodiments.

What is claimed is:

1. A method of estimating one or more reverberation parameters, the method comprising:
applying an adaptive, parametric, linear prediction filter configured to receive one or more power spectral density (PSD) estimates of signals of one or more channels as inputs, the prediction filter estimating at least one reverberation parameter related to reverberation time, the prediction filter being adapted during a period of reverberation by minimizing a cost function.

2. The method of claim 1, further comprising adapting the prediction filter using a gradient descent approach.

3. The method of claim 2, wherein the gradient descent approach operates according to a step size, the step size being provided by an adaptation controller.

4. The method of claim 1, further comprising determining the period of reverberation by detecting that only reverberation is present in the signals.

5. The method of claim 4, wherein the period of reverberation is determined by estimating a direct-to-reverberant ratio.

6. The method of claim 5, wherein estimating the direct-to-reverberant ratio provides spectral information of the presence of direct sound components over reverberant sound components.

7. The method of claim 6, wherein the direct and reverberant sound components are described by spectral coherence functions computed for at least two of the signals, the coherent parts of the coherence functions being indicative of direct sound components, the diffuse parts of the coherence functions being indicative of the reverberant sound components.

8. The method of claim 4, wherein determining the period of reverberation includes using decay detection.

9. The method of claim 8, wherein using decay detection includes detecting decaying signal components by comparing two smoothed PSD estimates, a first of the two smoothed PSD estimates corresponding to a current frame and a second of the two smoothed PSD estimates being delayed by a selected number of frames relative to the current frame.

10. The method of claim 1, wherein the prediction filter is implemented as an infinite impulse response (IIR) filter.

11. The method of claim 10, further including computing a gradient of the cost function according to a recursive prediction error principle.

12. The method of claim 1, wherein the prediction filter is implemented as a finite impulse response (FIR) filter.

13. The method of claim 1, wherein the prediction filter further estimates a reverberation parameter related to the ratio of power of direct sound and power of reverberation.

14. The method of claim 1, wherein the cost function is at least one of a cost function that is independent of power of the signals and a logarithmic cost function.

15. The method of claim 1, further comprising applying the at least one reverberation parameter estimated to a reverberation suppressor.

16. A system for estimating one or more reverberation parameters, the system comprising:
an adaptive, parametric, linear prediction filter having one or more power spectral density (PSD) estimates of signals of one or more channels as inputs, the prediction filter configured to estimate at least one reverberation parameter related to reverberation time, the prediction filter being adapted during a period of reverberation by minimizing a cost function.

17. The system of claim 16, further comprising an adaptation controller configured to determine the period of reverberation.

18. The system of claim 17, wherein the prediction filter is adapted using a gradient descent approach, the gradient descent approach operating according to a step size provided by the adaptation controller.

19. The system of claim 16, further comprising an array of microphones to provide the signals.

20. The system of claim 16, further comprising a reverberation suppressor configured to suppress reverberation in at least one of the signals based on the at least one reverberation parameter.

* * * * *